(12) United States Patent
Padilla et al.

(10) Patent No.: US 12,084,313 B2
(45) Date of Patent: Sep. 10, 2024

(54) APPARATUS AND METHOD FOR MEASURING PROPERTIES OF A ROPE

(71) Applicant: Cortland Industrial LLC, Stafford, TX (US)

(72) Inventors: Luis S. Padilla, Charlotte, NC (US); Wesley Conger, Houston, TX (US)

(73) Assignee: Cortland Industrial LLC, Stafford, TX (US)

( * ) Notice: Subject to any disclaimer, the term of this patent is extended or adjusted under 35 U.S.C. 154(b) by 1585 days.

(21) Appl. No.: 16/312,880

(22) PCT Filed: Jun. 26, 2017

(86) PCT No.: PCT/US2017/039244
§ 371 (c)(1),
(2) Date: Dec. 21, 2018

(87) PCT Pub. No.: WO2017/223555
PCT Pub. Date: Dec. 28, 2017

(65) Prior Publication Data
US 2019/0218062 A1 Jul. 18, 2019

Related U.S. Application Data

(60) Provisional application No. 62/354,497, filed on Jun. 24, 2016, provisional application No. 62/354,492, filed on Jun. 24, 2016.

(51) Int. Cl.
*B66B 7/12* (2006.01)
*B66C 1/12* (2006.01)
(Continued)

(52) U.S. Cl.
CPC .............. *B66B 7/1215* (2013.01); *B66C 1/12* (2013.01); *B66C 15/00* (2013.01); *B66D 1/54* (2013.01);
(Continued)

(58) Field of Classification Search
CPC ......... B66B 7/1215; B66C 1/12; B66C 15/00; B66C 1/54; B66D 1/54; D07B 1/145;
(Continued)

(56) References Cited

U.S. PATENT DOCUMENTS 8,958,994 B2 * 2/2015 Padilla ............... G01N 29/4445
73/152.58
2008/0105059 A1 * 5/2008 Turnbull ................. G01L 1/122
73/779
(Continued)

FOREIGN PATENT DOCUMENTS

EP 3135621 A1 * 3/2017 ............... B66B 1/30
NO 2009024452 A1 2/2009
(Continued)

OTHER PUBLICATIONS

International Search Report with Written Opinion for related Application No. PCT/US2017/039244 dated Nov. 30, 2017 (21 pages).
(Continued)

*Primary Examiner* — Jeffrey Donels
(74) *Attorney, Agent, or Firm* — Andrus Intellectual Property Law, LLP

(57) ABSTRACT

A rope, a system and a method for measuring one or more properties of a rope. A property evaluation system for ropes can be deployed for a number of different applications including, but not limited to, moving lines, e.g., crane or winch and static lines, e.g., mooring lines, stays, etc., to evaluate physical properties of the ropes and, in some cases, to help evaluate structural health of the ropes. A sheave assembly (10) may transmit a signal into a rope (14) to measure at least one property of the rope. At least one sensor (25) may be coupled to or assembled in the rope to measure at least one property of the rope.

18 Claims, 5 Drawing Sheets

(51) Int. Cl.
    *B66C 1/54*     (2006.01)
    *B66C 15/00*     (2006.01)
    *B66D 1/54*     (2006.01)
    *D07B 1/14*     (2006.01)
    *G01N 29/07*     (2006.01)
    *G01N 29/11*     (2006.01)
    *G01N 29/22*     (2006.01)
    *G01N 29/27*     (2006.01)

(52) U.S. Cl.
    CPC ............. *D07B 1/145* (2013.01); *G01N 29/07* (2013.01); *G01N 29/11* (2013.01); *G01N 29/22* (2013.01); *G01N 29/226* (2013.01); *G01N 29/27* (2013.01); *B66C 1/54* (2013.01); *D07B 2301/5509* (2013.01); *D07B 2301/5527* (2013.01); *D07B 2301/5563* (2013.01); *D07B 2301/5568* (2013.01); *D07B 2301/5586* (2013.01); *D07B 2501/20* (2013.01); *D07B 2501/2015* (2013.01); *D07B 2501/2061* (2013.01); *G01N 2291/0258* (2013.01); *G01N 2291/26* (2013.01)

(58) Field of Classification Search
    CPC .... D07B 2301/5509; D07B 2301/5527; D07B 2301/5563; D07B 2301/5568; D07B 2301/5586; D07B 2501/20; D07B 2501/2015; D07B 2501/2061; G01N 29/07; G01N 29/11; G01N 29/22; G01N 29/226; G01N 29/27; G01N 2291/0258; G01N 2291/26

See application file for complete search history.

(56) References Cited

U.S. PATENT DOCUMENTS

| | | | |
|---|---|---|---|
| 2011/0192683 A1* | 8/2011 | Weinberger | D07B 1/145 187/254 |
| 2016/0282311 A1* | 9/2016 | Hirokawa | G01N 29/14 |
| 2018/0229970 A1* | 8/2018 | Lehtinen | D07B 1/162 |
| 2019/0071282 A1* | 3/2019 | Zapf | B66B 7/1215 |
| 2019/0177115 A1* | 6/2019 | Hovi | B66B 5/00 |

FOREIGN PATENT DOCUMENTS

| | | | | |
|---|---|---|---|---|
| WO | WO-2011032587 A1 * | 3/2011 | | B66C 13/12 |
| WO | WO-2017223555 A1 * | 12/2017 | | B66B 7/1215 |
| WO | WO-2018060542 A1 * | 4/2018 | | B66B 1/14 |
| WO | WO-2018060552 A1 * | 4/2018 | | B66B 1/14 |

OTHER PUBLICATIONS

International Preliminary Report on Patentability for related Application No. PCT/US2017/039244 dated Jan. 3, 2019 (13 pages).
1 Canadian Examination Report in Corresponding Canadian Application No. 3,028,440 dated Oct. 17, 2023.

* cited by examiner

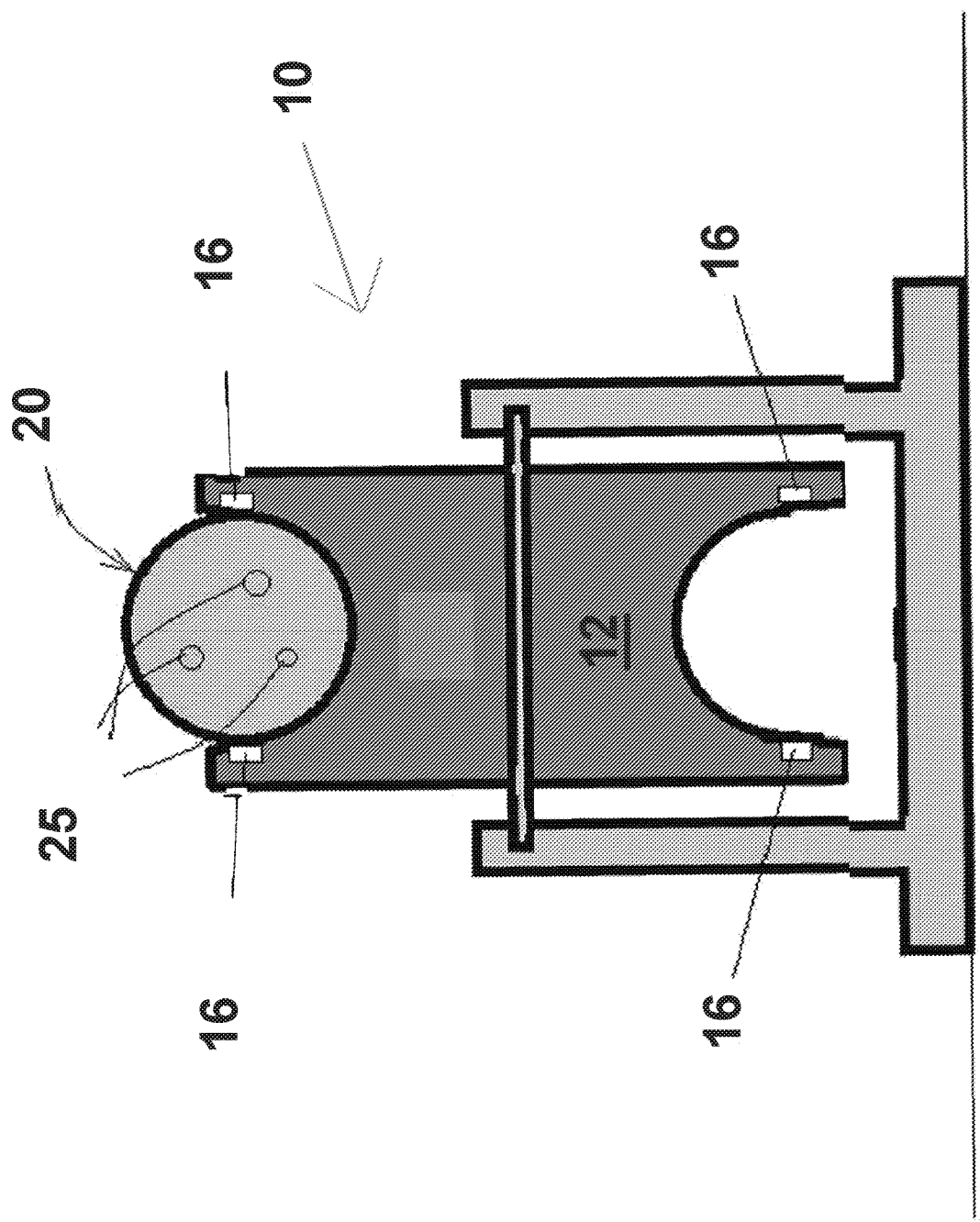

APPARATUS AND METHOD FOR MEASURING PROPERTIES OF A ROPE

RELATED APPLICATIONS

The present application claims the benefit of co-pending U.S. Provisional Patent Application No. 62/354,492, filed Jun. 24, 2016, and U.S. Provisional Patent Application No. 62/354,497, filed Jun. 24, 2016, the entire contents of both of which are hereby incorporated by reference.

FIELD

The present invention relates to a system for evaluating signal propagation properties through high performance synthetic fiber ropes for non-destructive evaluation (NDE) and structural health monitoring (SHM) of synthetic fiber ropes. Such a system can be used in conjunction with application-specific operating characteristics to understand the health of the rope and establish retirement criteria for the synthetic ropes and cables used in those applications.

SUMMARY

The lightweight nature of synthetic fiber rope provides many performance and economic advantages over metal wire rope. For example, when used in conjunction with sheaves in applications known as cyclic bend over sheave (CBOS) applications (e.g., cranes, elevators, heave compensation systems, and pulling lines), synthetic fiber rope allows for the use of equipment having a smaller footprint, less weight, and less power consumption than similar equipment for metal wire rope. However, regardless of whether metal wire or synthetic fiber rope is used in a particular application, assessment of the condition of the rope enables providing and maintaining a retirement criteria for reliable operation of the rope.

A dynamic component for determining and maintaining an accurate retirement criteria is the structural integrity of the rope. The integrity of the rope is used in conjunction with other components including user preferences (e.g., replacement at 50% strength, etc.) and the particular application, (e.g., mooring, cranes and winches, safety lines, etc.) to determine the retirement criteria.

A number of SHM and NDE systems and methods that measure rope and cable structural integrity to determine the retirement criteria of steel and other metallic wire ropes have been developed. However, there are no generally accepted methods of measuring structural integrity of synthetic ropes, and, thus, the typical practice for determining retirement criteria for synthetic fiber ropes relies on visual inspections and/or by tracking the history of usage for each rope. Visual inspections are inherently subjective and history-of-usage tracking can be highly inaccurate. As a result, current retirement criteria are not based on meaningful parameters.

In response to deficiencies of visual inspections and history of usage tracking, a number of objective methods for SHM and NDE for synthetic fiber ropes have been developed. The methods use secondary materials such as conductive carbon fibers and glass or polymeric optical fibers intertwined with the synthetic fibers of the rope. In theory, the secondary materials undergo the same stresses and wear as the synthetic fibers. The stresses on the secondary materials can be easily measured, and, from these measurements, the stresses and wear on the synthetic fibers is inferred.

In reality, because the materials are inherently different and due to the complicated structure of the rope, the synthetic fibers can undergo stresses and wear that the secondary materials do not. Furthermore, the secondary materials are only exposed to stresses in their immediate vicinity and, as such, there may be sections of the rope in which stresses and wear are not measured. Measurements obtained using secondary materials directly reflect the integrity of the evaluation materials only and indirectly reflect that of the synthetic fibers that make up the rope itself.

Furthermore, synthetic fiber ropes intertwined with secondary materials may be less strong, have different than expected abrasion properties, and be more difficult to manufacture than ropes formed entirely from synthetic fibers. For at least these reasons, methods for measuring the structural integrity of rope with optical fibers are not widely practiced.

Another method of monitoring and evaluating synthetic fiber ropes involves the use of longitudinal waves propagated over a length of rope. Such a method may utilize longitudinal wave propagation theory as described by M. Ferreira et al. in "Non Destructive Testing of Polyaramide Cables by Longitudinal Wave Propagation: Study of the Dynamic Modulus", Polymer Engineering and Science, Vol 40, No. 7, July 2000. This method calls for at least some physical contact with the rope as probes or tappers directly contact the rope to introduce the acoustic signal.

Furthermore, to determine meaningful retirement criteria with data from longitudinal waves, the rope must be held under constant tension (e.g., elevator cables, antenna stays, etc.) when being evaluated. This limits the use of this method to applications monitoring a stationary length of rope. Even then, vibrations in the rope introduced by devices in the environment of the rope, such as motors and sheaves, are picked up by the transducers, resulting in distorted wave measurements.

A further deficiency of this method is that it measures the entire length of the rope between the transducer and receiver, which are normally placed at each end of the rope. Therefore the resolution of this system is limited by the distance between the transducer and receiver. If only a small part of the rope is damaged, the system would not be able to indicate the specific location of the damage and the entire rope would have to be considered suspect.

Another limitation to this method is that it cannot be used in situations in which a portion of the rope is inaccessible, such as a rope used in conjunction with an offshore crane where one end could be under thousands of feet of water.

Yet another method of monitoring and evaluating synthetic fiber ropes is disclosed in U.S. Pat. No. 8,958,994, the entire contents of which is hereby incorporated by reference. This method uses a non-contact acoustic signal propagation property evaluation system.

The system includes a non-contact transducer spaced from a side of a rope to be evaluated. An electrical signal is generated by a signal generator. The transducer converts the electrical signal from the signal generator into an acoustic signal directed towards the rope. A first portion of the acoustic signal propagates through the rope in a transverse direction and a second portion of the acoustic signal passes around the perimeter of the rope. A transducer receives and converts the first and second portions of the acoustic signal into a second electrical signal. A signal processing circuit receives and converts the second electrical signal into a digital signal. A processor connected to the signal processing circuit and executing computer readable code attributes properties of the digital signal to the acoustic propagation properties of the rope which can then be used to determine the physical properties of the rope.

Such systems require constant control regarding the spacing of the rope and the transducer, which can be complex to control. Furthermore, many existing systems require separate, stand-alone devices to monitor the rope. These devices need to be mounted on a vehicle or vessel that is already crowded with other devices and equipment.

Also, some existing systems rely on the ability of an acoustic signal to enter into and propagate through a rope. There can be many challenges to get a signal to consistently and reliably penetrate a rope.

Accordingly, there may be a need for a system that enables structural health monitoring of synthetic fiber ropes at distinct locations along the length of the rope with greater resolution, ease, accuracy and consistency and less opportunity for signal loss, while occupying less space than existing systems.

The present invention relates to a device, system or method of measuring various properties of a rope indicative of the structural health of a rope. One independent embodiment may generally use a sensor on a sheave to generate and transmit a signal into a rope to measure at least one property of the rope. Due to the contact between the sheave and the rope, the amount of signal going into and propagating through the rope is better controlled compared to existing systems. In some embodiments, at least one sensor is coupled to the sheave. However, in other embodiments, the sheave can itself be designed to be a signal generator.

One independent advantage of incorporating health monitoring into a sheave may be that no additional equipment needs to be provided compared to a conventional (non-sensing sheave) arrangement. In existing arrangements, additional space is needed to house the additional equipment of the sensor assembly. In contrast, with the present invention, a conventional sheave can be replaced with a sheave of the invention without taking up any additional space compared to the conventional sheave.

Regardless of the configuration, a signal is transmitted generally transversely through the rope to measure the health of the rope at predetermined intervals along the longitudinal length of the rope. In some embodiments, depending upon the position or configuration of one or more sensors around sheave, the health of the rope can be measured nearly continuously or at worst once every rotation of the sheave (i.e., a distance equal to the circumference of the sheave).

In some embodiments, a pair of sensors may be used to measure one or more parameters of the rope. In one particular configuration, one sensor is coupled to the sheave assembly at a first radial distance from the shaft and a second sensor is coupled to the sheave assembly a second radial distance. In another configuration, sensors can be located at approximately the same radial distance from the shaft, but on opposite walls of the sheave. In yet another configuration, the two sets of sensors can be positioned to transmit and receive signals approximately perpendicular to each other.

In another independent aspect, the present invention relates to sensors included within the rope and capable of transmitting information indicative of the health of the rope. The sensors can transmit sensed conditions, such as, but not limited to stresses of the rope, temperatures the rope has been exposed to, thickness of the rope (or changes thereof), distance between sensors (and changes thereof), etc.

In some embodiments, sensors are woven into the rope as the rope is manufactured. In other embodiments, sensors are placed into the rope following manufacture of the rope.

In some embodiments, sensors can all be positioned at a substantially identical position within the rope. In other embodiments, sensors can a placed in a variety of radial positions (of the cross-section) along the length of the rope to provide information about the stresses and wear at various locations and depths within the rope. In yet other embodiments, sensors of one type can be placed at consistent locations, while sensors of a second type can be located in a variety of positions.

In some embodiments, sensors are placed within each strand to measure the health of each strand individually. In other embodiments, sensors are placed in less than each strand. In some embodiments, sensors are only provided in the core of the rope and not in any strand forming an outer jacket of the rope.

In some embodiments, sensors are included in the rope, and the sensors are activated to transmit information via an external stimulus. For example, in one embodiment, the sensors are activated to transmit information to a sensor on the sheave as they pass over the sheave. In yet another embodiment, non-contact stimulus can be utilized, such as is taught in U.S. Pat. No. 8,958,994

In one aspect of the invention, a synthetic fiber rope able to sense and communicate properties of the rope indicative of the health of the rope may be provided. The rope may generally include a plurality of strands intertwined to form a rope having a length defining an axial direction; and a plurality of sensors coupled to the rope along the length of the rope, the sensors being adapted to sense a characteristic of the rope and selectively transmit the sensed characteristic.

In some embodiments, the sensed characteristic includes as least one of the following: stresses of the rope, temperatures the rope has been exposed to, thickness of the rope, changes in the thickness of the rope, distance between sensors, changes in the distance between sensors, etc. In some embodiments, individual sensors from the plurality of sensors are included in each strand of the rope to assess the health of each strand. In other embodiments, individual sensors can be placed in between the strands of the rope to further assess the health of the rope.

In another aspect of the invention, a system for measuring one or more properties of a rope may be provided. The system may generally include a rope having a plurality of sensors contained within the rope; and a device adjacent to which the rope passes, the device being adapted to receive information from the plurality of sensors as the rope passes adjacent to the device.

In some embodiments, the device includes a sheave assembly. In other embodiments, the device includes as passageway for the rope to pass through and a pair of transducers on opposite sides of the passageway to received information from the sensors. In some embodiments, the transducers include non-contact transducers.

In yet another aspect of the invention, a method of measuring a property of a rope in use may be provided. The method may generally include providing a rope having a plurality of sensors at least partially contained within the rope; deploying the rope into use; sensing conditions of the rope when in use with the plurality of sensors; retracting the rope; and receiving the sensed conditions in the sensors as the rope is retracted.

Other independent aspects of the invention will become apparent by consideration of the detailed description, claims and accompanying drawings.

BRIEF DESCRIPTION OF THE DRAWINGS

FIG. 6 is a schematic cross-sectional illustration of another exemplary rope of the invention passing over a sheave assembly with a different sensor arrangement.

DETAILED DESCRIPTION

Figure 1:
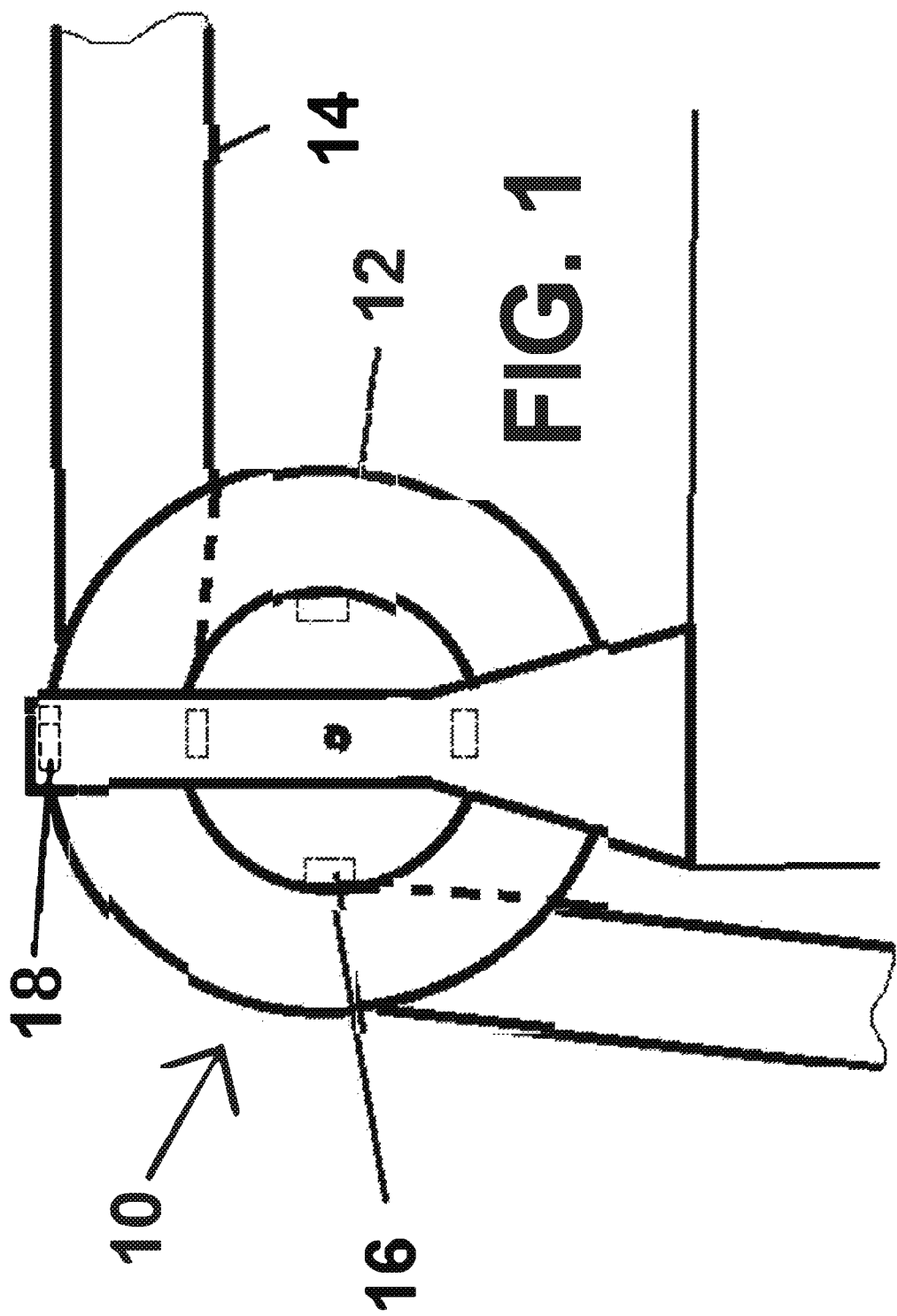
FIG. 1 is a schematic illustration of a system of measuring various properties of a rope indicative of the structural health of a rope of one independent embodiment.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limited.

The use of "including," "comprising," or "having" and variations thereof herein is meant to encompass the items listed thereafter and equivalents thereof as well as additional items. The terms "mounted," "connected." and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Finally, as described in subsequent paragraphs, the specific mechanical configurations illustrated in the drawings are intended to exemplify embodiments of the invention. Accordingly, other alternative mechanical configurations are possible, and fall within the spirit and scope of independent embodiments of the present invention.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIG. 1 illustrates one independent embodiment of a property evaluation system. The system monitors and evaluates a signal propagating transversely through a synthetic fiber rope 14 (or cable; hereinafter referred to as a "rope") moving along a longitudinal axis through a sheave assembly 10.

As illustrated, the sheave assembly 10 includes a wheel 12 on an axle or shaft to support movement and change of direction of a taut rope along a portion of its circumference. The wheel 12 defines a groove between two flanges around its circumference for holding or directing the rope 14. The grooved wheel 12 typically spins inside a frame mounted to a surface, such as a vessel, crane, building, etc. This allows the rope to move freely while minimizing wear and abrasion.

Although the illustrated embodiment shows the sheave assembly 10 redirecting the rope, the sheave assembly 10 may be used to lift loads, apply forces, create mechanical advantage, transmit power, etc. The terms sheave, drum, block, and pulley are sometimes used interchangeably. As used herein, "sheave" is meant to include blocks, drums, pulley arrangements, etc.

As noted above, the sheave assembly 10 can be mounted on a ship, boat or other sea bearing vessel. In such applications, the sheave assembly 10 can be used to redirect or reposition the rope. Also, the sheave assembly 10 can be part of a traction system for a winch.

In other embodiments, the sheave assembly 10 can be mounted on construction or lifting equipment, such as a crane. In such situations, the sheave assembly 10 can be positioned on the end of the boom. Alternatively, the sheave assembly 10 can be positioned adjacent the reel onto which the rope and from which the rope is deployed.

Referring again to FIG. 1, the sheave assembly 10 includes a sensor or transducer 16. Suitable transducers include commercially-available ultrasonic transducers, piezoelectric-based transducers, electromagnetic transducers, laser-based acoustic transducers, as well as other transducers. As illustrated, the transducer 16 can be mounted within the groove of the wheel 12. In some embodiments, the transducer 16 directly contacts the rope. In other embodiments, the transducer 16 transmits a signal into the wheel 12, and the signal then passes into the rope.

In some embodiments, more than one transducer 16 is coupled to the wheel 12 to allow for more measurements. For example, as illustrated, four transducers 16 can be coupled to the groove or trough of the wheel 12. With such an arrangement, a transducer 16 can measure properties of the rope 14 every quarter turn of the wheel 12. In other embodiments, transducers 16 can be placed at more frequent intervals to reduce the length of rope passing through the sheave assembly 10 between measurements.

In some embodiments, a single flexible transducer (not shown) could be configured to extend around the entire circumference of the wheel 12. Alternatively, the wheel 12 itself can be configured to function as a transducer. In such embodiments, transverse measurements of the rope can be taken along the entire axial length of the rope to identify the specific location of a characteristic (e.g., a weakness or other concern) related to the rope.

In the illustrated embodiment of FIG. 1, a transducer 18 is also coupled to the sheave assembly 10. As illustrated, the transducer 18 is coupled to the frame of the sheave assembly 10 adjacent the outer circumference of the wheel 12.

In some embodiments, the second transducer 18 is a non-contact transducer receiving the signal through an air gap between the rope 14 and the transducer 18. In other embodiments, the second transducer 18 can be placed in contact with the rope 14. For example, the second transducer 18 can be mounted on a roller (not shown) placed in contact with the rope 14. In some embodiments, the roller can be biased into contact with the rope 14 to eliminate spacing between the rope and second transducer 18 due to dimensional variance of the rope 14.

Although the transducer 18 is shown in FIG. 1, a second transducer 18 is not included in all embodiments. Rather, transducer(s) 16 can be used without a separate transducer 18. In such an embodiment, the transducer(s) 16 would both transmit and receive the signal while in contact with the rope 14.

The system can further include a combined signal generator and receiver unit (e.g., an ultrasonic signal generator and receiver unit) and a signal processing circuit (e.g., an analog to digital converter), as well as a software application operating on a processor (e.g., a computer (not shown)) to collect and interpret signal propagation property data. In some embodiments, the software application uses the data, in addition to other parameters, to evaluate the structural health of the rope 14.

A suitable signal generator, receiver, and converter includes a commercially available ultrasonic testing PCI board mounted in a PC chassis with an ultrasonic toneburst pulser/receiver unit and high speed analog to digital converter. A preferred pulser/receiver unit has a 0-300 V peak to peak sinusoidal or square wave output, a 20 kHz to 6.5 MHz pulse frequency, and a 0-15 pulse cycles capability. If additional signal strength is needed to overcome environmental noise or highly attenuative synthetic media, an amplifier can be used to increase the pulsing voltage to 1200 V. The analog to digital converter has up to a 100 MHz sampling resolution.

A suitable software application for collecting and extracting rope data includes the UTerminal or Utomography software package commercially available from FBS, Inc. of State College, Pa. Other suitable software applications can be off the shelf data acquisition programs that can be configured to acquire and interpret ultrasonic data in accordance with known phenomena, such as found in "Ultrasonic Waves in Solid Media" 1999 by Joseph L. Rose, the entire contents of which are hereby incorporated by reference.

In the embodiments described above, the software application running on the processor would trigger the pulser/receiver unit to generate an electrical pulse which is transmitted to the transducer 18. Alternatively, a windowed sinusoid of a particular frequency may be used.

The first transducer 16 converts the electrical excitation pulse into an acoustic energy wave, i.e., ultrasonic pulse signal, directed towards the rope 14. The ultrasonic pulse signal propagates into the rope 14. The portion of the ultrasonic signal that propagates into the rope 14 laterally, or generally transverse to the longitudinal axis of the rope 14, is of particular interest for measuring the structural health of the rope 14. Upon reaching a far surface of the rope 14, the propagating pulse signal continues through to the second transducer 18, if provided. In embodiments not utilizing the second transducer 18, the reflected or echoed signal is measured by the transducer 16.

The receiving transducer 16 or 18 is triggered to collect the signal at a predetermined time interval or when the portion of the rope 14 of interest is at a particular position to allow for measurement. In one embodiment, ninety-nine pulse signals, occurring over one and a half seconds, are received over a given length of the rope 14 and spatially averaged together. The averaged analog signal is filtered and amplified by the pulser/receiver unit and converted into a digital signal by the analog to digital converter. The digital signal, representing the data point for one cycle, or, alternatively, one particular position, is collected and stored in memory of the processor.

The software application extracts information, including amplitude and arrival time, from each data point and can be plotted against a measure of the cycle life of the rope 14. To extract the amplitude of each data point, a time-based window of the received radio frequency (RF) waveform is selected and the peak value of the signal is extracted.

Due to contact between the transducer 16 and the rope 14, the present system has advantages over systems using non-contact sensors with an air gap between the sensors and the rope. First, with a non-contact sensor, a large acoustical impedance mismatch between the air gap and the rope causes a portion of the ultrasonic signal to be reflected back from the rope and another portion to travel around the rope. Although the signal losses can be minimized in many ways, such as by reducing the size of the air gap, using focused transducers, matching the size of the transducer with the width of the rope, adjusting the signal frequency or amplitude of the pulse signal, and using high resolution receiving hardware (e.g., hardware having a high sample rate, a high digitizing rate, etc.), signal losses still happen and need to be taken into account with the prior art system. Making the non-contact system even more complex, an air gap needs to be accounted for on both sides of the rope with a two sensor system.

In the present system, there is no air gap between the rope 14 and transducer 16. If a second transducer 18 is used (see FIG. 1), any air gap can be minimized. Also, with such a configuration, only one air gap needs to be calibrated (not two) because the air gap is located only on the transceiver side of the sensor system. In other embodiments, such as the one illustrated in FIG. 2, both sensors 16 can be placed in contact with the rope to eliminate signal loss.

Figure 2:
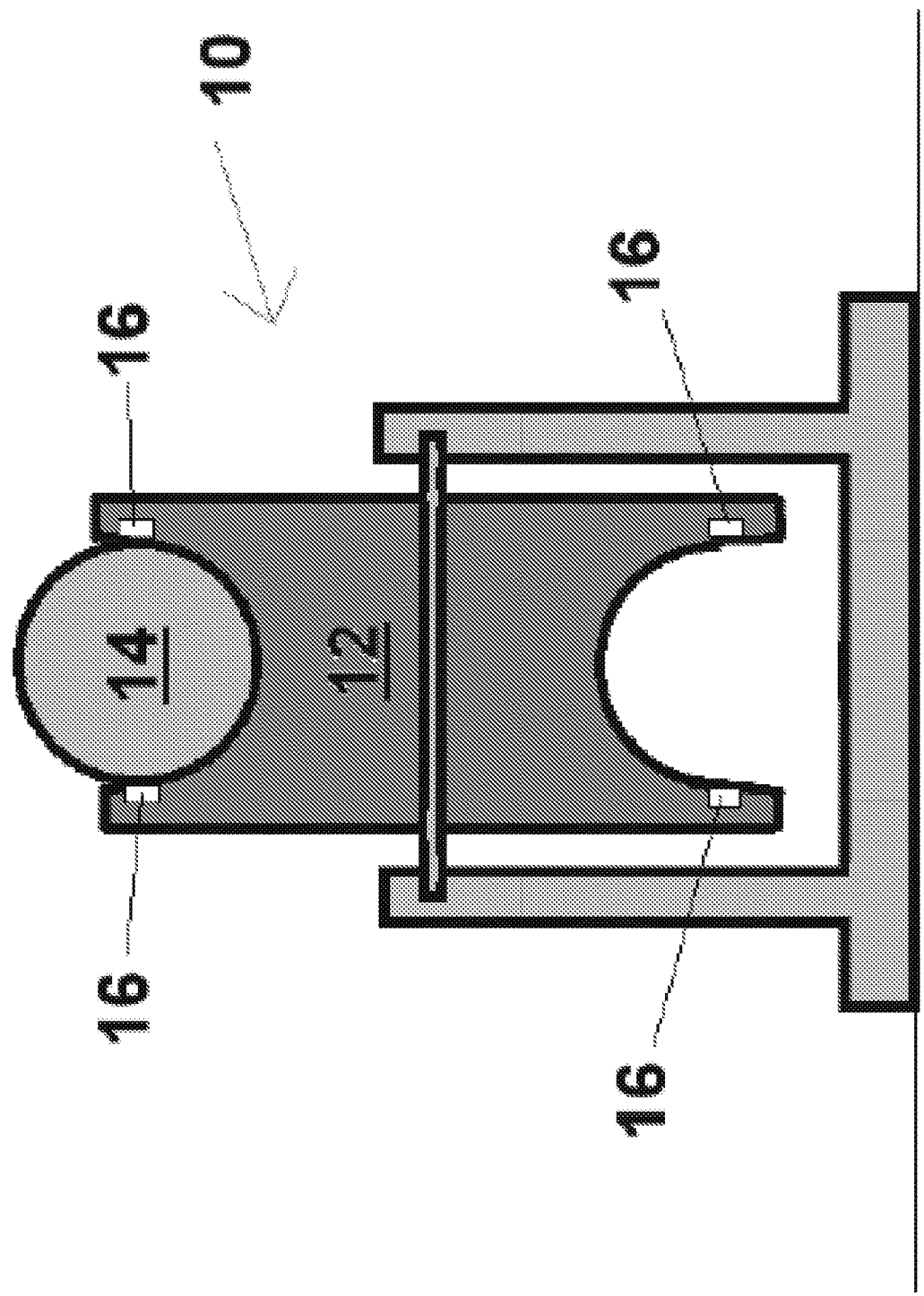
FIG. 2 is a schematic cross-sectional illustration of a system of measuring various properties of a rope indicative of the structural health of a rope of another independent embodiment.

FIG. 2 illustrates another embodiment of a property evaluation system or structural health monitoring system. Like the embodiment illustrated in FIG. 1, the system monitors and evaluates the signal propagating transversely through the rope 14 moving along a longitudinal axis through a sheave assembly 10.

As illustrated, the sheave assembly 10 includes the wheel 12 and transducers 16. Unlike the embodiment illustrated in FIG. 1, the transducers 16 are not positioned along the radially innermost trough of the groove (and at a crest defined by a radial position adjacent an outermost position of the rope). Rather, in FIG. 2, the transducers 16 are positioned on the flanges defining the groove. As illustrated, the transducers 16 are positioned on opposite flanges of the wheel 12 at a radial position that would contact the rope and communicate across the diameter of the rope. This position is approximately equal to a radius of the rope from the trough of the groove.

Similar to FIG. 1, one or more pairs of transducers 16 can be coupled to the wheel 12 at various angular locations of the wheel 12. In the illustrated embodiment of FIG. 3, two pairs of transducers 16 are positioned about 180 degrees apart. In other embodiments, the transducers 16 can be placed at much more frequent intervals to reduce the length of rope 14 passing through the sheave assembly 10 between measurements. In some embodiments, an array of transducers 16 or a single transducer 16 could be configured to extend around the entire circumference of the wheel 12. In such an embodiment, transverse measurements of the rope can be taken along the entire axial length of the rope to identify the specific location of a characteristic (e.g., a weakness or other concern) related to the rope.

In operation, the first transducer 16 converts the electrical excitation pulse into an acoustic energy wave (e.g., ultrasonic pulse signal) directed towards the rope 14. The ultrasonic pulse signal propagates into the rope 14. As mentioned above, the portion of the ultrasonic signal that propagates into the rope 14 laterally, or transverse to the longitudinal axis of the rope 14, is of particular interest for measuring the structural health of the rope 14. Upon reaching a far surface of the rope 14, the propagating pulse signal continues through to the second transducer 16. The signal can then be processed, such as by the means discussed above, to evaluate the properties of the rope 14 at multiple transverse locations of the rope 14 along its axial length.

In some embodiments, two or more transducers 16 can be arranged to transmit a signal in different directions through the rope to create a multidimensional (e.g., "3D") image of the rope. For example, one or more of the transducers 16, 18 of FIG. 1 can be used with one or more of the sensors provided in FIG. 2 to obtain data from different transverse directions (e.g., a first transverse direction and a second transverse direction perpendicular to the first transverse direction).

The data collected in the above operation can be used in variety of manners. In some embodiments, the software application measures changes in the signal propagation property data of the rope 14 to evaluate properties of the rope that would be indicative of the structural health of the rope 14. For example, one physical property of the rope 14 to consider is the elastic modulus which is known to change over time in response to fiber fatigue. The amount of energy transmission and speed of the propagating pulse signal 28 is a factor of the density and modulus of the rope 14. Accordingly, the change in travel time of ultrasonic pulse signals over a range of frequencies can be used to determine the change in the modulus of the rope 14.

Changes in the properties of the ultrasonic signals passing through the rope 14 over time can also be used (e.g., compared to earlier values for the rope 14) to determine changes in the modulus and, thus, the fatigue or wear of the rope 14. Alternatively, in the case in which there is no previously collected data for a particular rope, the data can be compared to a known reference value to approximately determine the modulus and, thus, approximately determine the fatigue or wear of the rope 14.

Two other parameters known to affect ultrasonic signal propagation properties are "thinning", or diameter reduction, and the temperature of the rope. Rope diameter reduction could cause changes in the ultrasonic wave arrival time and amplitude at the receiving transducer. Likewise, the modulus of the rope 14 is affected by the internal rope temperature, which could change the ultrasonic signal propagation properties. These and other physical parameters may be monitored, with these or other measurement techniques, and used to establish correction factors, if needed, for the received ultrasonic pulse signals.

The software application may operate in a rope health mode whereby an initial reference data set acquired for the rope 14 prior to, or immediately after, being put in service is used as a reference data set. Subsequent data sets are then compared to the reference data set. The health of the rope 14 is determined based on changes in the signal properties over time. The software may also operate in a non-destructive testing mode whereby the data sets are compared to predetermined threshold values to determine the health of the rope 14. The threshold values are stored in a database and may be determined by scanning a set of rope samples under known conditions.

Furthermore, the software application may provide the ultrasonic signal propagation data as another parameter for the retirement criteria for a rope 14 in a particular application. That is, the ultrasonic signal propagation properties of a rope may be monitored, along with other parameters, such as, but not limited to, the tension the rope has been under, the number of cycles over a sheave assembly, the time the rope has been in service, to determine when a rope should be taken out of service. In such a case, the software application may operate in one or both of the above modes, and the rope 14 is taken out of service and replaced based on a predetermined retirement criteria based on all the factors listed herein.

Pattern recognition routines may be employed by the software application to help analyze the received signals, evaluate ultrasonic signal propagation properties, and, in some cases, monitor the health of the rope. Signal properties and features can be statistical or probabilistic in nature such as the skewness, Kurtesis, or mean. Properties can also be drawn from time and/or frequency domains and from other sources such as a Hilbert transform, pulse duration, and/or rise or fall time. In addition, physical based properties derived from wave mechanics, e.g., wave velocity or arrival time as a function of frequency or at a particular frequency, frequency shifting compared to reference data, attenuation as a function of frequency, and the like, could be evaluated by the routines. In cases in which the software application evaluates the structural health of the rope, the benefit of using pattern recognition routines depends on the selection of meaningful signal properties for monitoring. Pattern recognition algorithms utilizing a linear discriminate approach, nearest neighbor rule, or measured neural net could be used.

Figure 3:
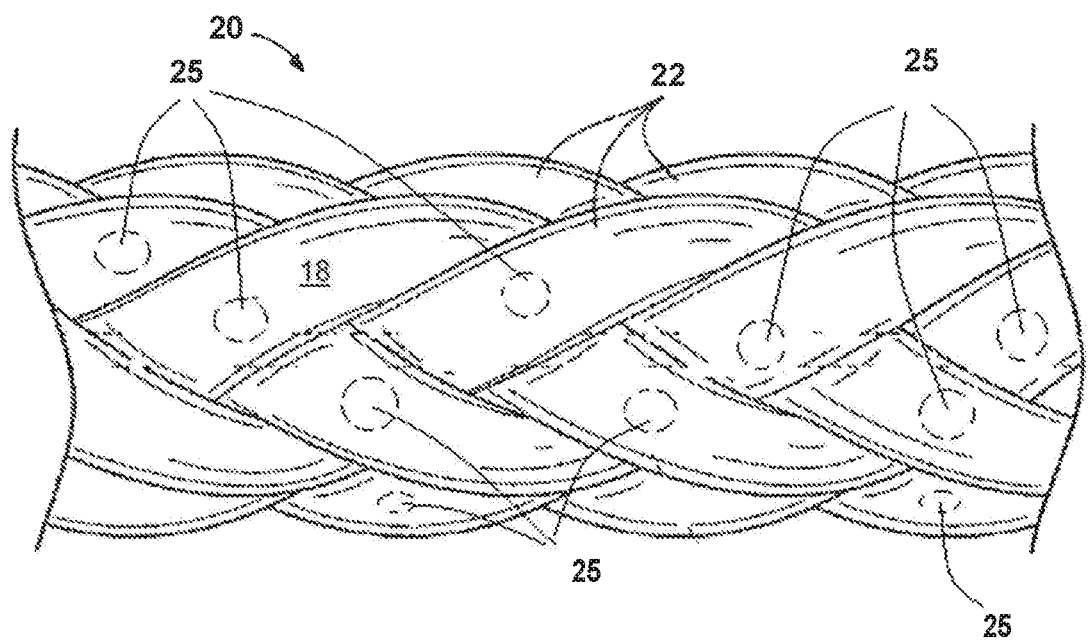
FIG. 3 is a side view of a system of measuring various properties of a rope indicative of the structural health of a rope of yet another independent embodiment including a rope with embedded sensors of another independent embodiment of the invention.

FIG. 3 illustrates a rope 20 that includes embedded sensors 25 to monitor the structural health of the rope 20. In other words, the sensors 25 are included within the rope 20 and capable of transmitting information indicative of the health of the rope 20. For example, the sensors 25 can transmit sensed conditions, such as, but not limited to, stresses of the rope, temperatures the rope has been exposed to, thickness of the rope (or changes thereof), distance between sensors (and changes thereof), etc. The sensors 25 can be incorporated into the rope 20 during manufacture or added at a later time.

Depending upon the information desired to be sensed, the sensors 25 may be configured and positioned in a variety of ways. For example, in one embodiment of this rope 20, the sensors 25 can all be positioned at a substantially identical position (i.e., same location from the outer circumference and substantially equally spaced along the longitudinal axis of the rope) within the rope 20. In other embodiments, the sensors 25 can a placed in a variety of radial positions of the cross-section along the length of the rope 20 to provide information about the stresses and wear at various locations and depths within the rope 20. In yet other embodiments, sensors 25 of one type can be placed at consistent locations, while sensors 25 of a second type (or sensing a different parameter) can be located in a variety of other positions.

In some embodiments, sensors 25 are placed within each strand 22, 24 to measure the health of each strand 22, 24 individually. In other embodiments, sensors 25 are placed in less than each strand 22, 24. In yet other embodiments, sensors 25 are only provided in the core 34 or adjacent the core 34 of the rope 20 and not in any strands 22 forming the outer jacket of the rope 20.

The sensors 25 embedded in the rope 20 can include many different types of sensors. For example, the sensors 25 can be miniature ultrasonic sensors, magnetic sensors, photoelectric sensors, capacitive sensors, piezoelectric sensors, pressure sensors, temperature sensors, load cells, and/or radio frequency identification (RFID) data loggers. One or more different sensors 25 can be used in different locations to measure different properties. For example, a magnetically-coded sensor can track position (relative to another sensor 25 or relative to an original position) while other sensors 25 can measure load, pressure, and/or temperatures—each of which can affect the health of the rope 20.

The sensors 25 can be active, semi-passive and passive. Active and semi-passive sensors 25 would use internal batteries to power their circuits. An active sensor 25 also uses its battery to broadcast radio waves to a reader or receiver, whereas a semi-passive sensor 25 relies on the reader/receiver (e.g., the transducer 16, 18) to supply its power for broadcasting. Passive sensors 25 would rely entirely on the reader/receiver as their power source. Near Field Communication (NFC), RFID technology, etc. can be used to communicate with or extract information from the embedded sensors 25.

Information regarding the health of the rope 20 can be received from the sensors 25 many different ways. In some embodiments, the sensors 25 are activated to transmit information via an external stimulus. For example, in one embodiment, the sensors 25 are activated to transmit information to a sensor/transducer 16, 18 on the sheave assembly 10 (see FIGS. 5-6) as the sensors 25 pass over the wheel 12. In yet another embodiment, the rope 20 can pass through a non-contact sensor assembly, as disclosed in U.S. Pat. No. 8,958,994, to obtain information as the rope 20 passes by.

Figure 4:
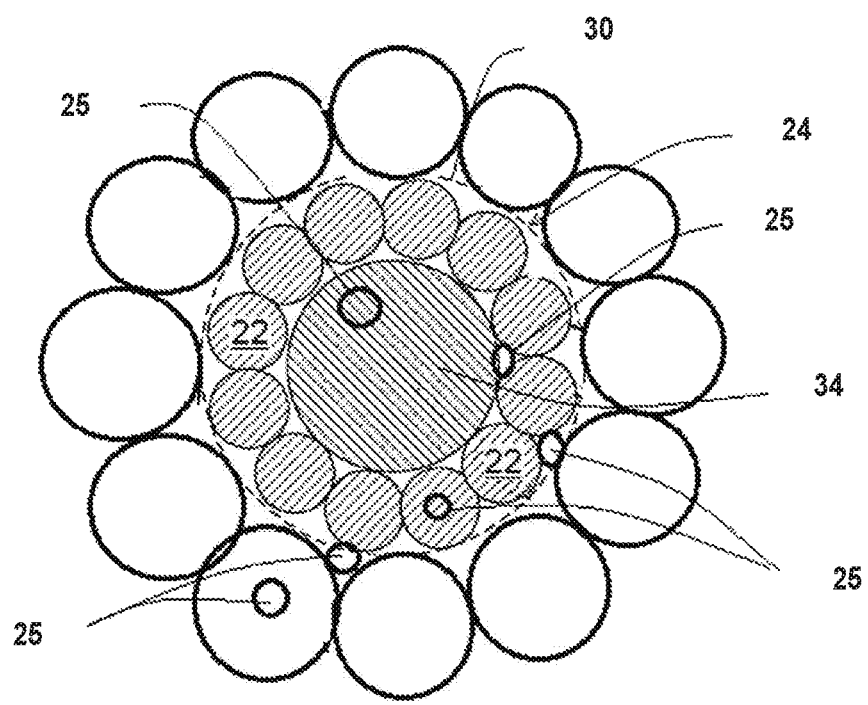
FIG. 4 is a cross-sectional view of a rope having a center strand, wherein sensors are embedded within or adjacent to the center strand.

As discussed above, in some embodiments, sensors 25 are only provided in or adjacent the core 34 of the rope 20 and not in any strands 22 forming the outer jacket of the rope 20. One such embodiment is illustrated in FIG. 4. In some situations, such an embodiment can incorporate a reduced wear rope 20, such as that described in U.S. Patent Application Publication No. 2015/0354136, the entire contents of which is hereby incorporated by reference. This particular configuration will be described with reference to FIG. 4 even though the configuration of FIG. 4 is not limited to such a reduced wear rope.

As shown in FIG. 4, a reduced wear rope 20 would generally include a plurality of primary strands 22 each including a plurality of fibers formed of a high-friction material, the plurality of primary strands defining an outer surface and a longitudinal center passageway 30 of the rope 20; and a non-load bearing secondary strand 24 having a strand outer surface and disposed within the longitudinal center passageway 30 of the rope, the secondary strand 24 including, at least on the strand outer surface, a plurality of structurally-stable fibers formed of a non-flowable, low-friction material. One or more of the sensors 25 can be incorporated in the non-load bearing center passageway 30 to protect the rope 20 from unnecessary wear from the sensors 25.

As shown in the exemplary embodiment of FIG. 4, the illustrated rope 20 generally includes a high-friction, load bearing outer jacket or envelope (e.g., high-friction, load bearing outer strands 22 including high-friction fibers) surrounding a low-friction, non-load bearing core (e.g., a non-load bearing center strand 24 including structurally-stable, non-flowable, low-friction fibers). As such, the rope 20 may provide one or more advantages associated with a high-friction outer jacket (e.g., acceptable surface coefficient of friction in applications in which outer surface friction may be desired (winching, splicing, etc.)), and with a low-friction core (e.g., reduced friction and wear on the load bearing strands 22 of the rope 20, as explained in greater detail herein). In other words, the illustrated rope 20 does not sacrifice rope performance to achieve reduced friction and wear.

It should be understood that the terms "high" and "low" are relative terms. For example, in the illustrated constructions, the outer strands 22 and fibers have a higher coefficient of friction than the core strand(s) 24 and fibers which, in turn, have a lower coefficient of friction than the outer strands 22 and fibers. Similarly, the outer strands 22 and fibers may have a higher strength than the core strand(s) 24 and fibers which, in turn, have a lower strength than the outer strands 22 and fibers.

The illustrated rope 20 includes a plurality of primary, load bearing strands 22 surrounding at least one auxiliary, non-load bearing strand 24. The illustrated center strand 24 is a low-friction strand (relative to the illustrated outer strands 22) to reduce the friction at the center of the rope 20, which is where most of the friction occurs. As such, the fibers of the rope 20 are subjected to relatively little wear as they rub against each other, resulting in, for example, an increased useful life compared to previous ropes.

The fibers of the outer strands 22 may comprise materials such as, without limitation, a recrystallized high modulus polyethylene (for example, Plasma®), a liquid crystal polyester (LCP: for example, Vectran® available from Kuraray Co., Japan), a gel-spun polyethylene (for example, Spectra® available from Honeywell International, Inc., New Jersey, U.S.A.), a para-aramid (for example, Kevlar, available from DuPont, Del., U.S.A. or Twaron® available from Teijin Aramid B.V., The Netherlands), a para-aramid copolymer (for example, Technora®—available from Teijin Aramid B.V.), a polyamide (nylon), a polyester, or the like or combinations thereof. These fibers may also have a polyurethane finish, although other finishes may alternatively be used.

In some constructions, one or more of the outer strands 22 may include composite strands formed of more than one material, such as more than one of the exemplary materials identified above. In some other constructions (e.g., in which the coefficient of friction of the rope surface is of less importance) and for other aspects of the invention, one or more of the outer strands 22 may include composite strands formed of both high- and low-friction materials. For example, the rope 20 may include a structure similar to that described in U.S. Pat. No. 6,945,153, the entire contents of which is hereby incorporated by reference.

The plurality of outer strands 22 may be braided with one another. For example, the outer strands 22 may be braided in a "12×12" pattern like ropes provided by Cortland Cable of Cortland, N.Y. That is, there may be twelve outer strands 22 braided in a single braid pattern, and each of the twelve outer strands 22 may in turn include twelve sub-strands braided in a single braid pattern. The sub-strands may in turn include a plurality of synthetic fibers; each strand 22 may be braided with a center sub-strand formed of a low-friction material (e.g., fibers) in a manner similar to the construction of the illustrated rope 20. Similarly, the plurality of outer strands 12 may define a rope structure as described in U.S. Pat. No. 5,901,632, the entire contents of which is hereby incorporated by reference.

The rope 20 and/or the plurality of outer strands 22 may alternatively be braided using other patterns (e.g., 12×3, 128, etc.) in which the rope 20 or strand is braided with its core separated from its outer surface. In any case, the plurality of outer strands 22 define the outer surface of the rope 20 and an inner longitudinally-extending passageway 30 in which the center strand 24 is disposed.

As discussed above, the center strand(s) 24 can include a plurality of non-flowable, structurally stable, and solid synthetic fibers formed of a low-friction material (that is, a low-friction material with a coefficient of friction against the high-friction material lower than the coefficient of friction of the high-friction material against itself). In embodiments, the material of the fibers can also be low strength (e.g., having a lower strength than the fibers). Preferably, the material of the fibers is structurally-stable and non-flowable, meaning that center strand 24 stays positioned in the passageway 30 and does not flow, creep or get squeezed out between the outer strands 22 to the outside of the rope 20. The fibers of the center strand(s) 24 may be braided, twisted, etc.

These fibers may comprise, for example, without limitation, ultra-high molecular weight polyethylene (UHMWPE)-based materials such as low-friction UHMWPE (for example, Dyneema® UHMWPE available from DSM N.V., The Netherlands, Spectra® 900 and Spectra® 1000 available from Honeywell International, Inc., or Endumax® available from Teijin Aramid B.V.), fluoropolymer-based materials such as expanded polytetrafluoroethylene (ePTFE; comprising non-flowable, stable, and solid fibers; for example, Omnibend® available from W. L. Gore & Associates, Inc., Delaware, U.S.A.), modified polytetrafluoroethylene, fluorinated ethylenepropylene (FEP), ethylene-chlorotrifluoroethylene (ECTFE), ethylene-tetrafluoroethylene (ETFE), a perfluoroalkoxy polymer (PFA), or the like or combinations thereof.

In some embodiment, such as the one illustrated in FIG. 4, the center strand 24 may include a hybrid strand formed of one or more of the exemplary low-friction materials identified above in combination with other materials. In such constructions, the center strand 24 may include a non-load bearing center or core element 34, formed of a material having a relatively higher coefficient of friction than the low-friction material. The core element 34 may be braided.

The core element 34 may comprise, for example, without limitation, a multi-filament polyester (available from Kuraray, Co., Japan; Teijin Limited, Japan: or Unifi, Inc., North Carolina, U.S.A.), a para-aramid copolymer (for example, Technora® available from Teijin Aramid B.V.), a liquid crystal polyester (LCP; for example, Vectran® available from Kuraray Co., Japan), a polyamide, a polyester, or the like or combinations thereof.

The core element 34 of the illustrated embodiment can be surrounded by a low-friction material (e.g., fibers), with the low-friction material being between the inner surface of the outer strands 22 and the core element 34 at all points along the entire length and about the entire circumference of the passageway 30. To surround the core element 34, the low-friction material (e.g., fibers) may, for example, form a braided jacket r be twisted around the core element 34 to define the low-friction strand 24.

As illustrated, sensors 25 can be embedded within the core element 34 or adjacent the core element 34, such as between the braided jacket and the core 34 or between strands 22 of the braided jacket. In some embodiments, the sensors 25 can be embedded within the strands 22 of the braided jacket as well.

Note that not all embodiments of the reduced wear rope 20 require a core element 24. Rather, some embodiments (not illustrated) of the rope 20 simply have a plurality of primary strands 22 defining an outer surface and a longitudinal center passageway 30 with at least one secondary strand 24 within the longitudinal center passageway 30 of the rope 20. In such embodiments, the sensors 25 can be embedded within a strand 22, 244 or adjacent a strand 22, 24.

In some embodiments, the condition of the outer strands 22 may need to be evaluated. In such embodiments, sensors 25 may be embedded in the strands 22. Alternatively, sensors 25 may be positioned adjacent the strands 22 on the secondary strand 24.

The sensors 25 can be coupled to the rope 20 many different ways. The sensors 25 can be incorporated (e.g., woven) into the rope 20 as the rope 20 is manufactured. In such embodiments, one or more sensors 25 can be woven into strand as the fiber is converted into a strand 22, 24. Alternatively, one or more sensors 25 can be placed in between strands 22, 24 as the strands 22, 24 are configured or woven into a rope 20 or part thereof.

In other embodiments, the sensors 25 are placed into the rope 20 following manufacture of the rope 20. Such sensors 25 can be held in place, if necessary, with adhesives, fasteners, bonding, etc.

As noted above, information regarding the health of the rope 20 can be received from the sensors 25 many different ways. In some embodiments, the sensors 25 are activated to transmit information via an external stimulus. For example, in one embodiment, the sensors 25 are activated to transmit information to a sensor/transducer 16, 18 on the sheave assembly 10 (see FIGS. 5-6) as the sensors 25 pass over the wheel 12.

In another embodiment, the rope 20 can pass through a non-contact sensor assembly, such as that disclosed in U.S. Pat. No. 8,958,994, to obtain information as the rope 20 passes by. In yet other embodiments, combinations of the above techniques can used along with external signal generator and receiver to not only obtain information from the discrete internal sensors 25, but also obtain information as the rope 20 passes by external sensors.

Figure 5:
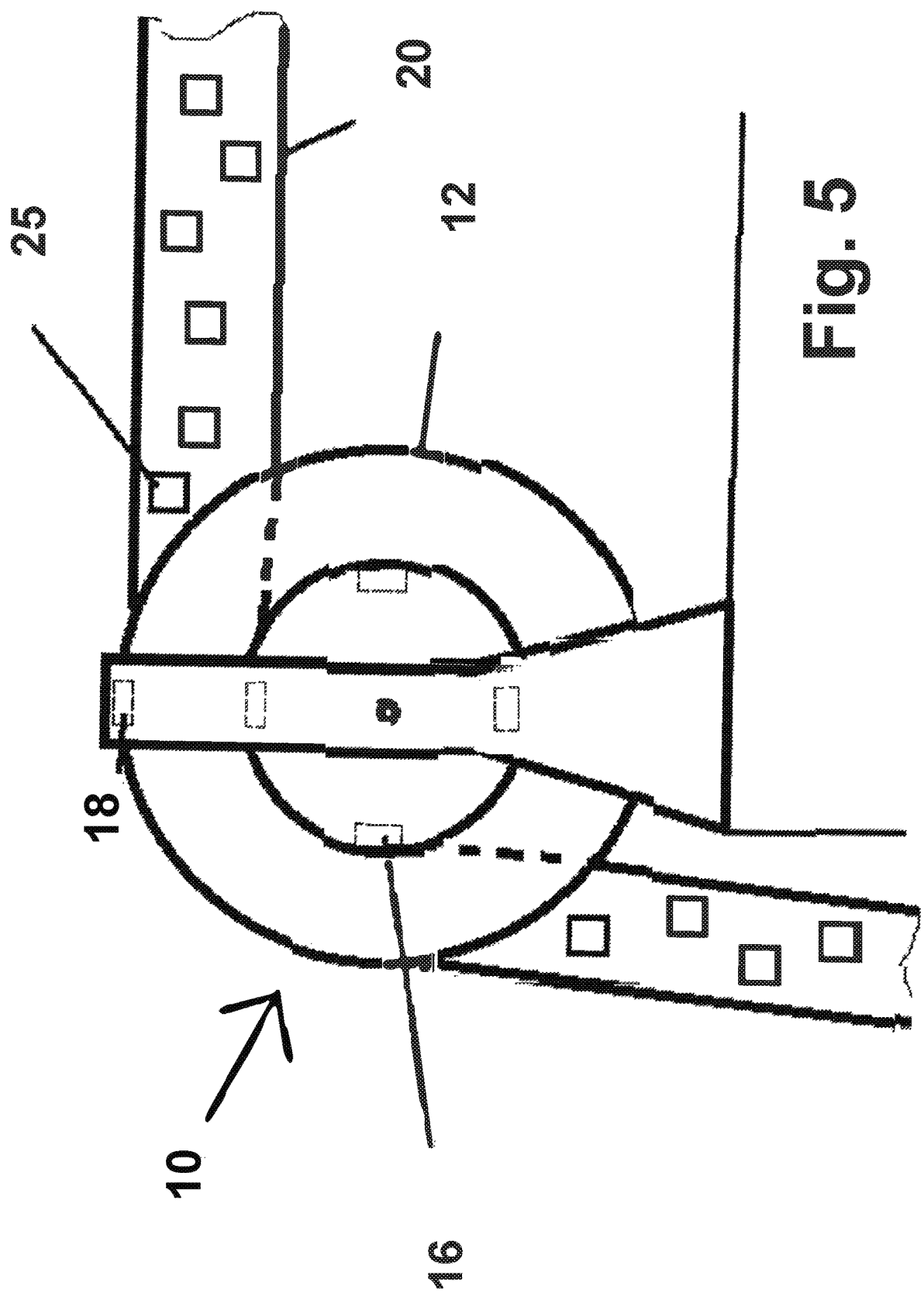
FIG. 5 is a schematic illustration of an exemplary rope of the invention passing over a sheave assembly with a first sensor arrangement.

As shown in FIGS. 5-6, the rope 20 may be used with the sheave assembly 10 shown in FIGS. 1-2 and operated as described above. As noted above, the sensors 25 may actively transmit information, and/or the signal generator and receiver unit can be used to trigger the internal sensors 25 to transmit information. Alternatively or additionally, the signal generator and receiver unit can independently evaluate the health of the rope 20 by measuring the propagation of a generated signal through the rope 20.

In one operation of the embodiment shown in FIG. 3, the transducer 16 sends a signal towards the rope 20. Depending upon the sensors 25 used, the signal may take many different forms, such as an acoustic signal, a magnetic field, etc. The signal propagates into the rope 20. The signal triggers the embedded sensors 25 to provide information to at least one of the first or second transducer 16, 18. The embedded sensors 25 communicate a signal to the transducer 16 or 18. The signal can then be processed, such as by the means discussed above, to evaluate the properties of the rope 20 at multiple transverse locations of the rope 20 along its axial length.

In another operation of the embodiment shown in FIG. 5, transducer 18 can send a signal towards the rope 20. The signal can trigger the embedded sensors 25 to provide information to at least one of the first or second transducer 16, 18. The embedded sensors 25 communicate a signal to the transducer 16 or 18. The signal can then be processed, such as by the means discussed above, to evaluate the properties of the rope 20 at multiple transverse locations of the rope 20 along its axial length. In some embodiments, the signal from transducer 18 propagates into the rope 20 and as such measures an independent characteristic of the rope 20. In such an embodiment, the signal can be received by transducer 16 coupled to the wheel 12.

As noted above, in some embodiments, different sensors 25 can provide different types of information different ways. For example, some sensors 25 may not need a signal to trigger communication with the transducer 16. If two or more different types of sensors 25 are used, different signals may be necessary to trigger a response from each sensor 25.

In some embodiments in which only information from the embedded sensors 25 is desired, a non-contact system, such as a non-contact system described in U.S. Pat. No. 8,958,994, can be used to receive data from the sensors 25. Such a system does not necessarily have the problems discussed above because the non-contact sensors are only receiving a signal being transmitted from within the rope 20. Because the signal is generated internal to the rope 20, the system does not suffer from the same signal loss problem with an externally generated signal. If necessary, the non-contact transducer can also initiate a trigger signal if needed to activate the embedded sensors 25.

Like the embodiment shown in FIG. 5, in FIG. 6, this embodiment can also independently evaluate a transmitted signal (i.e., transmitted from sensor 16) propagating transversely through the rope 20 moving along a longitudinal axis through a sheave assembly 20 to measure one or more properties of the rope 20.

In one particular operation of the embodiment shown in FIG. 6, transducers 16, 18 can receive information from sensors 25 as the rope 20 passes over the sheave assembly 10. The signal can then be processed, such as by the means discussed above, to evaluate the properties of the rope 20. As further noted above, transducers 16 may need to send an excitation pulse towards the rope 20 to initiate communication with sensors 25. One or more of these sensors 16, 18 can be used to receive information from sensors 25 while others can be used to measure other characteristics of the rope 20.

The independent embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. For example, various alternatives to the certain features and elements of the present invention are described with reference to specific independent embodiments of the present invention. With the exception of features, elements, and manners of operation that are mutually exclusive of or are inconsistent with each independent embodiment described above, it should be noted that the alternative features, elements, and manners of operation described with reference to one particular independent embodiment are applicable to the other independent embodiments.

One or more independent features and/or independent advantages of the invention may be set forth in the claims.

What is claimed is:

1. A system for measuring one or more properties of a rope, the system comprising:
    a sheave assembly including a wheel having a circumferential groove for at least partially receiving the rope; and
    a transducer coupled to the wheel in the groove sheave, the transducer being operable to transmit a signal into the rope when the rope is in contact with the wheel to measure at least one property of the rope, the signal being transmitted in a generally transverse direction relative to a longitudinal direction of the rope.

2. The system of claim 1, wherein the transducer is coupled to a trough of the groove.

3. The system of claim 1, wherein the transducer is a first transducer, and wherein the system further comprises a second transducer coupled to the sheave assembly.

4. The system of claim 3, wherein the second transducer is in a position opposite the rope when the rope is in the groove of the wheel.

5. The system of claim 4, wherein the groove is at least partially defined by a first flange on one axial end of the wheel and a second flange on an opposite axial end of the wheel, and wherein the first transducer is coupled to the first flange and the second transducer is coupled to the second flange.

6. The system of claim 5, wherein the sheave assembly includes a shaft supporting the wheel, and wherein the first transducer is positioned a first distance from the shaft and the second transducers is positioned a second distance from the shaft.

7. The system of claim 3, wherein the first transducer and the second transducers are positioned to contact opposite sides of the rope approximately across a diameter of the rope.

8. The system of claim 3, wherein the first transducer and second transducer define a first transducer set, and wherein the system further comprises a second transducer set coupled to the wheel to measure a property of the rope at a different axial location of the rope than the first transducer set.

9. The system of claim 1, further comprising a plurality of rope transducers coupled to the rope along an axial length of the rope to measure a property of the rope at a location of a rope transducer, each rope transducer being activated by the transducer coupled to the sheave to communicate information about the rope.

10. A synthetic fiber rope comprising:
    a plurality of strands intertwined to form a rope having a length defining an axial direction; and
    a plurality of sensors coupled to the rope along the length of the rope, the sensors being adapted to sense a characteristic of the rope and selectively transmit a signal representative of the sensed characteristic, wherein individual sensors of the plurality of sensors are included in each strand of the rope to assess a health of each strand.

11. The rope of claim 10, wherein the sensed characteristic includes at least one of the following: stresses of the rope, temperatures the rope has been exposed to, thickness of the rope, changes in the thickness of the rope, distance between sensors, and changes in the distance between sensors.

12. The rope of claim 10, wherein the individual sensors are spaced at regular intervals within each strand.

13. A synthetic fiber rope comprising:
a plurality of strands intertwined to form a rope having a length defining an axial direction; and
a plurality of sensors coupled to the rope along the length of the rope, the sensors being adapted to sense a characteristic of the rope and selectively transmit a signal representative of the sensed characteristic;
wherein the plurality of strands is a first plurality of strands defining an outer surface and a longitudinal center passageway of the rope; and
wherein the rope further comprises at least one second strand positioned within the center passageway of the rope and having different properties than the first plurality of strands, wherein the plurality of sensors are contained within or coupled to the at least one second strand.

14. The rope of claim 13, wherein the at least one second strand includes a core element and a plurality of strands substantially surrounding the core element, and wherein sensors from the plurality of the sensors are within or coupled to the core element.

15. A system for measuring one or more properties of a rope, the system comprising:
a rope having a plurality of sensors contained within the rope, the plurality of sensors being configured to sense information relating to the rope; and
a device adjacent to which the rope passes, the device being adapted to receive the information from the plurality of sensors as the rope passes adjacent the device, wherein the device includes a sheave assembly comprising a wheel having a circumferential groove for at least partially receiving the rope, and a transducer coupled to the wheel to receive a signal from the plurality of sensors within the rope, wherein the transducer is coupled to a trough of the groove.

16. A system for measuring one or more properties of a rope, the system comprising:
a rope having a plurality of sensors contained within the rope, the plurality of sensors being configured to sense information relating to the rope; and
a device adjacent to which the rope passes, the device being adapted to receive the information from the plurality of sensors as the rope passes adjacent the device, wherein the device includes a passageway for the rope to pass through and a pair of transducers on opposite sides of the passageway to receive information from the sensors.

17. The system of claim 15, wherein the plurality of sensors measure at least one of temperature, load, pressure, or thickness of the rope.

18. The system of claim 15, wherein the plurality of sensors each include a memory to store a maximum parameter measured when the rope is deployed for use, the recorded parameter being communicated to the device as the rope is retracted from use.

* * * * *